UNITED STATES PATENT OFFICE.

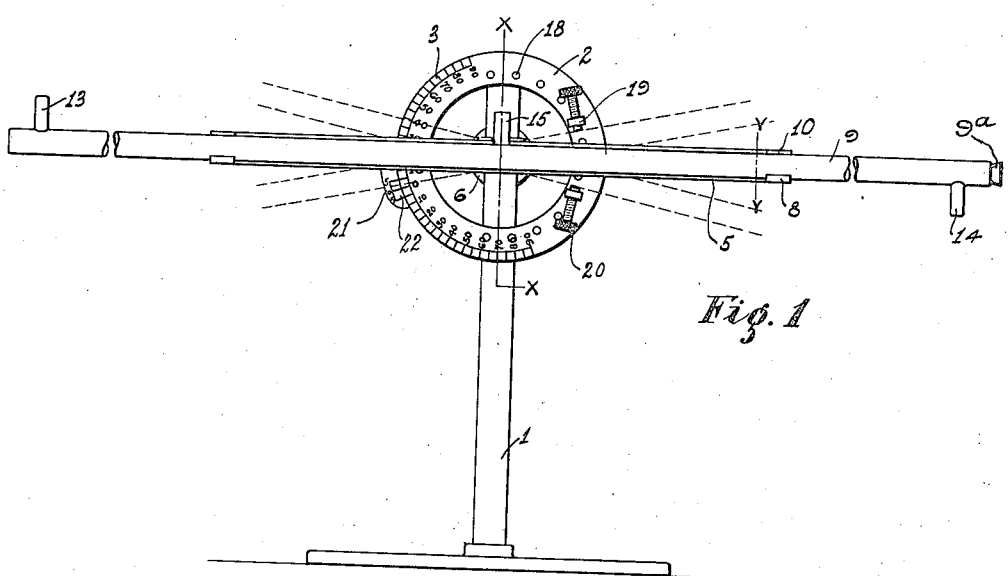
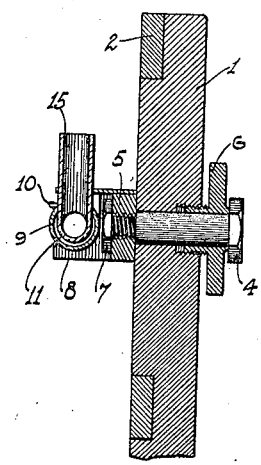
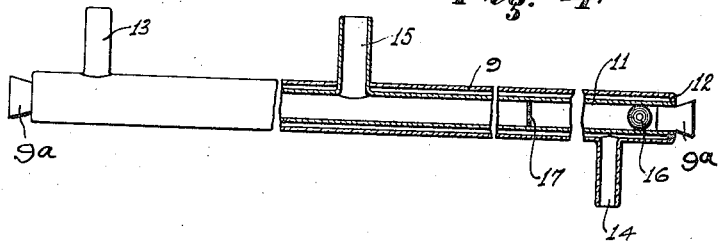

CHARLES BROWNING, JR., OF SACRAMENTO, CALIFORNIA.

VISCOMETER.

1,244,025.   Specification of Letters Patent.   Patented Oct. 23, 1917.

Application filed August 16, 1913. Serial No. 785,080.

*To all whom it may concern:*

Be it known that I, CHARLES BROWNING, Jr., a citizen of the United States, residing at Sacramento, in the county of Sacramento, State of California, have invented certain new and useful Improvements in Viscometers; and I do declare the following to be a clear, full, and exact description of the same, such as will enable others skilled in the art to which it appertains to make and use the same, reference being made to the accompanying drawings, and to the characters of reference marked thereon, which form a part of this application.

This invention relates to improvements in instruments or paraphernalia adapted for use in testing oil and is particularly designed as an improvement in a viscometer by means of which absolute viscosity may be determined in conformity with the law of Poiseuille requiring product of pressure and time constant. A further object of the invention is to produce a viscometer of wide range and one on which there may be determined, with equal effect, by variation in the size of sphere and angle used, the viscosity of gases or of the most viscous liquids either transparent or opaque. A further aim in producing my improved viscometer is to provide such a one as will give absolute viscosity and which will be made standard by the use of a standard tube of standard bore and a sphere of standard size, as will appear. In addition to the above, I am to provide a viscometer of such structure as to be able to surround the fluid, of which the viscosity is to be determined, by a liquid that maintains it at constant temperature or in such a manner as the fluid referred to may have its temperature rapidly changed from one constant value to another. Also in my improved viscometer the fluid, of which the viscosity is to be determined, will be absolutely protected from dust or interfering elements and I can further make a duplicate determination of the viscosity of the fluid quickly and with the greatest efficiency and convenience.

A further object of the invention is to produce a simple and inexpensive device and yet one which will be exceedingly effective for the purposes for which it is designed.

These objects, I accomplish by means of such structure and relative arrangements of the parts as will fully appear by a perusal of the following specification and claims.

On the drawings, similar characters of reference indicate corresponding parts in the several views.

Figure 1 is a front elevation, partly broken out, of the complete instrument.

Fig. 2 is a sectional view taken on a line X—X of Fig. 1.

Fig. 3 is a sectional view taken on a line Y—Y of Fig. 1.

Fig. 4 is a side elevation, partly in section, of the fluid containing tubes in which the test is made.

Referring now more particularly to the characters of reference on the drawings, the numeral 1 designates a supporting standard on the upper end of which is mounted a circular protractor 2 having any suitable subdivisions or indicating means 3 on its face for the purpose of showing the angle at which the tubes hereinafter described may be set. Projecting centrally through the member 1 and centrally with respect to the protractor 2 is a pivot bolt 4 having mounted on its end a beam 5, there being an adjusting nut 6 turnable around said member 4 and screw mounted into the member 1 whereby said member 6 may be moved to cause the head 7 to bind the beam 5 against the standard 1 to hold it in any fixed position. Mounted on the beam 5 at spaced distances are two beam angles or seats 8 adapted to receive the outer tube 9 of the testing tube structure hereinafter described, which tube is held in position in the seats 8 by means of overhanging band springs 10.

The tube structure comprises an outer tube 9 and an inner tube 11, the space between the same being closed at the ends as at 12. At one end of the tube 9 is an inlet 13 and at the other end an outlet 14, whereby the liquid used to fix the temperature of the material in the inner tube may be readily passed through the outer tube and around the inner tube. The ends of the inner tube are normally open to be closed by corks or similar stoppers 9$^a$ and said inner tube is provided with a central outlet 15 for the means of allowing the escape of air bubbles or for any other desired purpose.

The numeral 16 designates the sphere adapted to fit within the inner tube in rolling relation and on said inner tube are any desired number of indicating marks 17 to show the distance of the travel of the sphere 16 within said inner tube 11.

The member 2 is provided with a plurality of holes 18 in its face by means of which stop members 19 may be set in spaced relation thereon according to the amount of movement to be permitted the beam 5 and the tube structure which it carries. Each of these stops 19 is provided with a hand screw 20 for delicately adjusting the distance between the same to limit the movement of the tubes, as above noted.

Secured on the beam 5 is a vernier 21 engaging the outer edge of the protractor 2 and provided with suitable marks 22 to coincide with the marks 3 for the purpose of setting the instrument.

In practice, the fluid to be tested is filled into the inner tube 11 and the same then suitably corked at both ends. The temperature determining liquid is then passed around the inner tube 11 through the tube 9 and the stop members 19—20 are adjusted to fix the angle at which the test is to be taken and the instrument is then moved to that position and clamped rigidly by means of the member 6. The sphere 16 then rolls down the inner tube through the fluid and since the tubes are transparent, its course can be readily followed and timed and thence by taking the angle at which the instrument is set and also the time of travel of the ball and making the proper calculation, the viscosity of the fluid can be readily determined according to the law of Poiseuille and by varying the temperature of the outside liquid, the various tests desired may be made under the various conditions.

As can be readily seen, the instrument may be used for making the duplicate tests or checkings merely by throwing the beam 5 back to normal position again and then again setting the angle so as to cause the sphere 16 to move and also the temperature may be readily and quickly changed by varying the temperature of the liquid passing through the tube 9. The said tubes 9 and 11 may be of course made of any suitable transparent material and such as will be the least liable to expansion and contraction under all ordinary temperatures.

The stop adjustments and the means for fixing the tubes stationary may be used to great advantage in making tests rapidly and accurately although of course any other similar mechanism may be used for this purpose.

By reason of the sphere 16 fitting so closely into the inner tube 11 an absolute viscosity may be determined and by making the tubes and sphere of a standard size the instrument might become of standard use for giving absolute viscosity of all manner of fluids.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention what I claim as new and useful and desire to secure by Letters Patent is:—

1. A structure for testing the viscosity of liquids comprising a standard, a transparent tube movable on said standard and adapted to receive and discharge a liquid, and a sphere of greater specific gravity than the liquid disposed in rolling relation within said tube, and means for holding the tube at definite angles of inclination, as described.

2. A structure for testing the viscosity of liquids comprising a supporting standard, a transparent tube pivotally mounted on said supporting standard and adapted to receive and discharge a liquid, a sphere disposed in rolling relation within said tube and adapted to move through the liquid, said tube being capable of being moved on its pivotal point, and means whereby it may be fixed in any desired position, as described.

3. A structure for testing the viscosity of liquids comprising inner and outer transparent tubes, the space between the two being closed at the ends, an outlet from said inner tube centrally thereof, an inlet and outlet for said outer tube, a sphere disposed in said inner tube, and means pivotally mounting said tubes, as described.

4. A structure for testing the viscosity of liquids comprising a supporting standard, a transparent tube pivotally mounted on said supporting standard, a sphere disposed in rolling relation within said tube, a protractor disposed adjacent said tube, said tube being arranged to be moved on its pivotal point and fixed in any desired position, as described.

5. A structure for testing the viscosity of liquids comprising a standard, a transparent tube pivotally mounted on said standard so that its angle of inclination to the horizon may be varied, said tube being provided with a jacket, and a sphere disposed in rolling relation within said tube, as described.

6. A structure for testing the viscosity of liquids comprising a standard, a protractor secured to said standard, a transparent tube pivotally mounted on said standard, and a pair of set screws spaced apart on each side of said tube and adapted to engage the same to limit the movement of said tube, as described.

7. A structure for testing the viscosity of liquids comprising a transparent tube supported and arranged to be moved and fixed in different positions, a sphere of greater specific gravity than the liquid disposed in said transparent tube, the diameter of said sphere relative to the diameter of said tube being such that its motion in the liquid is limited and controlled by said relative size of the ball and tube, and means for holding the tube at definite angles of inclination, as described.

8. A structure for testing the viscosity of liquids comprising a tube, means for holding the tube at definite angles of inclination, such tube being arranged to receive and discharge a liquid, and a perfect sphere disposed in rolling relation within the tube, as described.

9. A structure for testing the viscosity of liquids comprising a jacketed tube, means for fixing the tube at definite angles of inclination, such tube being arranged to receive and discharge a liquid, and a perfect sphere arranged in rolling relation within the tube, as described.

In testimony whereof I affix my signature in presence of two witnesses.

CHARLES BROWNING, Jr.

Witnesses:
JOSHUA B. WEBSTER,
VERADINE WARNER.